UNITED STATES PATENT OFFICE.

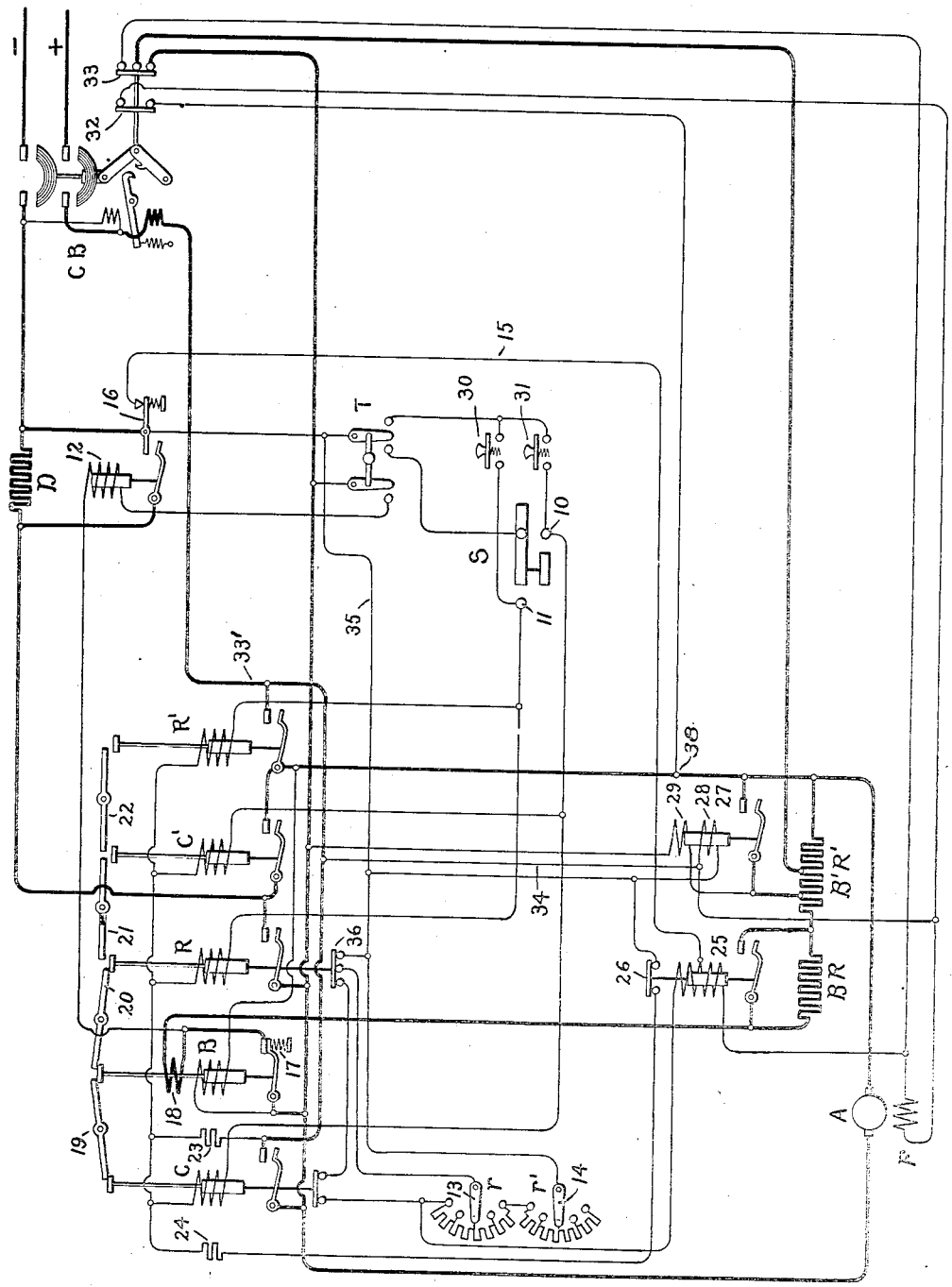

JOHN EATON, OF SCHENECTADY, NEW YORK, ASSIGNOR TO GENERAL ELECTRIC COMPANY, A CORPORATION OF NEW YORK.

MOTOR-CONTROL SYSTEM.

1,297,120.      Specification of Letters Patent.      Patented Mar. 11, 1919.

Application filed February 7, 1914. Serial No. 817,365.

*To all whom it may concern:*

Be it known that I, JOHN EATON, a subject of the King of Great Britain, residing at Schenectady, in the county of Schenectady, State of New York, have invented certain new and useful Improvements in Motor-Control Systems, of which the following is a specification.

This invention relates to the control of electric motors and has for its object the provision of means whereby an electric motor may be started, stopped, and generally controlled in a reliable and efficient manner. My invention relates more specifically to the control of reversible electric motors, one of the objects of my invention being to provide means whereby an electric motor may be quickly stopped and its direction of rotation reversed.

While my invention is capable of general application, it has been found to be particularly useful in connection with such mechanisms as planers, printing presses and the like, in which the direction of movement of a heavy mass must be reversed periodically. It is essential that in this case the motor be brought to rest quickly and then started in the opposite direction with a minimum strain on the apparatus. In a previous Patent, No. 1,041,845, issued to E. J. Murphy and myself, we have disclosed a system of control for bringing about this result. This system is intended for operation on a planer or the like and has been found very satisfactory for this purpose. In the ordinary operation of a planer, the return speed is very much greater than the forward or cutting speed. For instance, it is very common to have the cutting speed vary from 250 to 500 revolutions of the motor, while the return speed will vary from 500 to 1000 revolutions. Since at high speed the field is weakened, the full field connections are made at the instant of applying the dynamic brake in order to get a maximum braking torque. Since the motor is running at high speed and the field is strengthened, the braking current will reach a maximum at this time. On the cutting stroke, however, which is at slow speed with strong field, the current, not being increased by reason of the strengthening field, will be lower, assuming the same resistance in the circuit in both cases. Since the motor will commutate this maximum current at full field on the high speed and the parts are designed to control such current, it will also obviously commutate this value or more on the slow speed since the field strength is then at a maximum. I have found that by cutting out a section of the braking resistance when the motor is reversed at low speed, so that the initial braking resistance will be less, I am able to obtain as large a dynamic braking current as when the motor is running at 1000 revolutions and even larger. I accomplish this result without increasing the number of electromagnetic switches employed in the system. To this end I utilize one of the electromagnetic switches which controls the brake resistance. These switches gradually short-circuit the brake resistance so as to give a graduated dynamic braking effect. In the specific embodiment of my invention herein disclosed I so arrange one of these switches that when the dynamic braking circuit is closed on one direction of rotation, namely the cutting or low speed direction, this switch will immediately close to short-circuit a section of resistance, so as to decrease the initial resistance through which the motor brakes. The switch is so arranged that while it will not immediately close upon the reversal from the high speed rotation it will close to short-circuit the resistance when the speed of rotation has fallen to the low value, thereby giving the graduated dynamic braking effect.

Another feature of my present invention resides in the provision whereby the line contactors cannot close until the motor field has reached a predetermined strength. In the system of the patent above referred to, the dynamic braking current is controlled by an electromagnetic switch which only closes when the field of the motor reaches a predetermined strength. The purpose of this is to prevent the increase of the dynamic braking current until the field is of sufficient strength to prevent sparking at the commutator. In one embodiment of my invention I utilize this electromagnetic switch to prevent the line contactors, which constitute the reversing mechanism, from closing until the field is built up to the proper value, and to this end I so connect at least one line contactor for each direction of rotation that it cannot close until the switch which is controlled by the field strength is closed. This obviates the necessity of "holding out" coils on these contactors, such as were provided in the system of the patent above referred to, since the line contactors cannot close until the dynamic braking circuit has been closed for at least a short period and therefore until the motor is at least partially slowed down. This moreover assures that the motor will never be started under any condition with a weakened field.

A further object of my invention is the provision of means whereby the motor will be automatically included in a dynamic braking circuit and be quickly brought to rest upon the occurrence of abnoral circuit conditions such as a failure of voltage or an overload on the motor. To this end I provide a circuit breaker which will automatically disconnect the motor from the source of supply upon the occurrence of such abnormal circuit conditions and when the circuit breaker opens it will automatically connect the shunt field windings across the motor armature terminals in parallel with the brake resistance thereby dynamically braking the motor and bringing it quickly to rest.

Other objects and purposes of my invention will appear in the course of the following specification in which I have shown my invention embodied in concrete form for purposes of illustration.

Referring to the drawing which shows diagrammatically one embodiment of my invention, A represents the armature and F the shunt field of an electric motor for driving a planer or the like. The direction of rotation of this motor is controlled by four electromagnetic switches or contactors, two for each direction of rotation. Two of these switches are designated as C and C', respectively, for driving in the forward or cutting direction, while the other two switches, designated as R and R', respectively, when closed drive the planer in the opposite or "return" direction. These four switches are operated by shunt windings controlled by a master switch S. In the drawing the parts are shown in the position they assume when the circuit breaker is open and all parts deënergized. When the line is energized by the closing of the circuit breaker CB and the master controller S is moved so as to engage the finger 10, the windings of the contactors C and C' are energized in parallel across the line, while with the master switch in the opposite position in contact with the finger 11, the windings of the two contactors R and R' are similarly connected across the line. The starting resistance D is provided for the motor, this resistance being controlled by electromagnetic switch 12 connected so as to close and short-circuit the resistance when the counter-electromotive force of the motor rises to a predetermined value. For varying the speed of the motor I have provided two rheostats, one of which has a resistance $r$, which is controlled by the arm 13, while the other has a resistance $r'$ controlled by the arm 14. When the motor is started the switch 12 is open and both of the resistances $r$ and $r'$ are short-circuited through the wire 15 and the switch 16, which is spring closed. When the switch 12 closes the switch 16 is opened so as to break the short-circuit. With the master switch S in engagement with the finger 10, that is, in the "cutting" position, a portion of the resistance $r$, the amount of which will depend upon the position of the lever 13, will be connected in the field circuit. When the master switch is moved to the opposite position the connection to the arm 13 of the rheostat is broken by the closing of the line contactor R and is made at the arm 14 so that all of the resistance $r$, as well as a portion of the resistance $r'$, will now be in the field circuit.

In order to bring the motor armature to rest quickly I provide a brake resistance through which the motor armature is short-circuited. This brake resistance is divided into two sections BR and B'R'. The purpose of these two sections of resistance is to graduate the dynamic braking current as the field builds up and the motor slows down. For making the dynamic braking connections I provide the contactor B. This contactor is normally held closed by a spring 17. The winding of this contactor is connected across the armature of the motor so that while the motor is operating the winding tends to close the switch. I have likewise provided a series winding 18 which is not energized until the contactor is closed. The five contactors R, R', C, C', and B being arranged as shown in the drawings, are provided with four mechanical interlocks 19, 20, 21 and 22, coöperating with the contactors so as to compel operation in a predetermined manner. The structure of these interlocks forms no part of my invention, but for purposes of illustration I have show them pivoted at their middle points and engaged by upwardly projecting stems of two adjacent contactors in the closed position. The operation of these bars is described in the patent above referred to and will be sufficiently clear without further description. While the contactor B is closed by a spring, this spring is not sufficiently stiff, to apply any considerable pressure to the contacts, since electromagnetic means are provided for holding the contacts tightly closed.

The line contactors are provided with means for preventing their closure except when the field of the motor is of a predetermined strength. This means consists of resistances 23 and 24 interlocked as hereinafter described with the contactor, which controls the brake resistance BR. This electromagnetic switch or relay 25 is provided with a winding having one terminal connected with the shunt field F while the other end is connected with the resistance r. The winding of this relay is divided into two halves which are differential or oppose each other, so that when the two halves are energized they neutralize each other and the relay will not close. It is obvious that when the switch 16 is opened, the field current must pass through the two differential portions of the relay winding and through any field resistance which may be in circuit, to the negative side of the line. The relay is therefore inoperative under this condition. When, however, the switch 16 is closed the upper half of the relay winding and the resistance are short-circuited so that one half the winding is energized and the relay becomes active. The winding of this relay is so adjusted that when the field current approaches a maximum, that is, when the field is nearly full strength, the relay will close, but when the field is weak the relay will not close even though only one of the windings is energized. When the switch 16 closes, the field resistance is short-circuited so as to strengthen the field, but the field increases gradually due to the inductive effect and until the field current rises to the predetermined value, which is preferably near the maximum, the relay 25 will not operate. When it does operate it short-circuits a section of brake resistance BR. This relay 25 is provided with an interlocking contact 26 connected with the resistance 24 in parallel with the line contactors so that when the relay 25 closes, the circuit of the resistance 24 will be open to permit the line contactors to close.

One of the main features of my invention resides in the provision of means whereby a portion of the braking resistance B'R' is short-circuited when the motor is dynamically braked from one direction of rotation so that the dynamic braking takes place only through the resistance BR, while when the motor is reversed from the opposite direction of rotation the braking occurs through both portions of resistances BR and B'R'. For accomplishing this purpose I provide the electromagnetic switch or relay 27 which is so arranged that when the dynamic braking circuit is closed with the motor rotating in the cutting or forward direction it will be closed, but will not be closed when the dynamic braking circuit is closed with the motor rotating in the opposite or "return" direction. To this end the magnetic switch has two windings, one of which, 28, is connected across the line, while the other winding, 29, is connected across the motor armature. These two windings are so proportioned that when the counter-electromotive force of the motor opposes the voltage applied to the winding 28, the switch will remain open, but when the counter-electromotive force is reversed the relay will close. Furthermore, this relay is arranged to be closed by the potential coil alone so that when the counter-electromotive winding 29 is opposing the winding 28 the switch will not close until the counter electromotive force reaches a low value, that is, when the motor speed drops to a proper point.

In addition to the control through the master controller S, I provide manual control for use when required, consisting of two normally open switches or pushbuttons 30 and 31, one for closing the circuit independently of the master controller for each direction of rotation. It will be noted that during the manual control through the pushbuttons 30 and 31 there is no resistance in the dynamic braking circuit during the operation in the cutting direction. When the switch T is thrown to effect manual operation, the circuit of the counter-electromotive force contactor 12 is opened so that the resistance D remains permanently in series with the motor. This gives a slow speed for jogging during manual control. Since the contactor 12 is open, the relay 25 will be closed, and since the relay 27 is always closed during the cutting operation, all of the braking resistance BR and B'R' will be short-circuited. This will enable the operator to bring the motor to a stop almost instantaneously so that there will be practically no drift to the planer table during manual control. This manual control is thrown into and out of operation by the switch T. This switch in one position throws the master controller and the resistance contactor 12 out of service and connects the pushbuttons 30 and 31 so that they control the line contactors. In the other position of the switch the push buttons are out of service.

In order to immediately stop the motor upon the occurrence of abnormal circuit conditions, such as the failure of voltage or an overload on the motor I provide a circuit breaker which is so arranged as to apply an effective dynamic brake to the motor when the circuit breaker opens. To this end, in the particular form illustrated I have provided two contacts 32 and 33 which move into and out of engagement with fixed contacts as the circuit breaker closes and opens. The contact 33 engages with three contacts, two of which close a dynamic braking circuit through the motor and a portion of the brake resistance B'R' while the other is connected with the shunt field. The contact 32 engages with two contacts, one of which is connected with the field terminal while the other is connected with the armature circuit during dynamic braking. When the circuit breaker is opened the armature circuit is immediately closed through a portion of the resistance B'R', and the field circuit is closed across the armature in parallel with the section of braking resistance.

As thus constructed and arranged, the mode of operation of my device is as follows: Assuming the switch T to be in the left hand position, and assuming that the master switch or controller S has been moved by the dog on the planer into engagement with the finger 10, contactors C and C' will be energized from the positive side of the line, through the resistance 23, thence through the windings of contactors C and C' in parallel to the controller finger 10, thence through the controller and the contacts of the switch T to the negative side of the line. The resistance 24 and the contactors C and C' are in parallel with each other and in series with the resistance 23, the circuit through this resistance 24 extending through the interlock 26 and back to the negative side of the line through the wire 35. These resistances are so adjusted that the contactors C and C' will not close until the parallel circuit through the resistance 24 is opened. The field circuit is made from the positive side of the line, through the wire 33', wire 34, thence through the field winding and the lower coil of the winding of relay 25, wire 15 and switch 16 to the negative side of the line. The relay 25 will therefore close, but not until the field has become energized at substantially full strength. When the relay 25 closes the closing of its main contacts at this time has no effect, but the opening of the interlock 26 opens the circuit of the parallel resistance 24 and causes the contactors C and C' to close. The line contactors therefore do not close until the field has reached substantially full strength. The contactor 27 will also close, since its lower winding 28 is connected across the line, and the winding 29, which has a counter-electromotive force coil gradually becomes energized in a direction to assist winding 28. Contactors C and C' as well as relay 25 and relay 27 are now closed and the armature circuit of the motor is therefore closed from the positive side of the line, through the wire 33', through the contacts of contactor C, armature A, contactor C' and resistance D to the negative side of the line. The motor will now start in the cutting direction and as the armature speeds up the contactor 12 will close to short-circuit the resistance D of the armature circuit. As soon as this contactor 12 closes the wire 15 which short-circuits the field resistances r r' is open circuited, and the field current now flows through the wire 35 through the interlocking contacts 36 on the contactor R, through a portion of resistance r, thence through the two windings of the relay 25 to the field winding, then back to line through conductor 34. This causes the motor to speed up due to the insertion of the resistance r in the field circuit and causes the relay 25 to open. The motor now runs at full speed in the cutting direction. When the end of the stroke is reached the master switch S is thrown over into engagement with the finger 11, thereby deënergizing the contactors C and C' and energizing contactors R and R'. Immediately upon the opening of the contactor C the brake contactor B which has been trying to close, due to the energization of its winding across the armature, and also due to the spring 17, closes. This closes a dynamic brake circuit through the motor from the left hand brush through the contacts of brake contactor B, through the holding winding 18, through the brake resistance BR, through the contacts of contactor 27 to the other brush. It will be noted that the contactor 27 is closed because, in this case, the counter-electromotive force of the motor is in a direction to assist the winding 28, which is across the line. The contactor 27 remains closed upon dynamic braking and the initial dynamic braking action therefore takes place through only a portion of the braking resistance. At the same time that the line contactors C and C' open the starting resistance contactor D opens, thereby short-circuiting the field resistance and the upper winding of the relay 25 through the wire 15. The relay 25 will therefore close as soon as the field strength builds up. When it does close, the dynamic braking current is increased and the motor is brought quickly to rest. Upon the closing of this relay 25, the circuit of the resistance 24 is opened at the interlock 26 so that the contactors R and R' may close. These contactors can only close, therefore, when the motor is brought substantially to rest for the additional reason that the contactor R R' cannot close until the brake contactor is opened. This latter contactor is held closed by the dynamic braking current. When the contactors R and R' are closed the motor starts on the return stroke, the relay 25 being closed, and since the counter-electromotive force of the motor is now in the opposite direction, the contactor 27 will open and remain open. As the motor speeds up, the contactor 12 will again close to short-circuit the starting resistance. This then opens the circuit through the short-circuiting wire 15 and inserts a resistance in the field circuit. In this case the field circuit will be through the wire 35, thence through the resistance r', determined by the position of the arm 14, through all of the resistance r, thence through the two differential windings of the relay 25 to the field winding. The motor will therefore come up to a higher speed than on the "cutting" stroke. This also causes the relay 25 to open. The motor is now running on the high speed "return" stroke with the contactors R, R' and 12 closed and the relay 27 open. When the end of the stroke is reached, the dynamic braking circuit will be closed through the brake contact B as before, but in this case, since the relay 27 is open, the dynamic brake circuit will be through all of the brake resistances BR and B'R'. As the motor field builds up to the proper value the relay 25 will close so as to short-circuit the brake resistance BR. This will increase the dynamic braking effect and as the motor slows down further the relay 27 will close because of the falling off of the counter-electromotive force which energizes the winding 29, that is, the winding 28 which is connected across the line overpowers the winding 29 and causes the relay to close. This cuts out a section of resistance B'R' and quickly brings the motor to rest. It will be seen, therefore, that on the cutting stroke the relay 27 is closed when the motor is reversed, and therefore the braking circuit includes only a portion of the braking resistance, whereas when the motor is operating in the running direction the relay 27 is open so that the dynamic brake circuit includes both of said resistances BR and B'R'. It should also be noted that the relay 27 operates toward the end of the dynamic braking cycle upon reversal from "return" speed to cut out the section of resistance B'R', that is, it coöperates with the relay 25 to give a graduated braking effect. On braking in the "cutting" direction there is therefore one less step than in the return direction. In the "cutting" direction only a part of the resistance is in circuit during dynamic braking, which has the effect of bringing the motor to rest much more quickly than on the return stroke when both resistances are included in the initial braking circuit. This is accomplished without any addition to the number of contactors employed.

If the switch T is thrown to the opposite position the master switch S and the winding of the contactor 12 are thrown out of circuit and the push buttons 30 and 31 are connected in so that the operator can start and stop manually in either direction desired. In the case of failure of voltage or the occurrence of an overload on the motor at any time, the circuit breaker CB will open, thereby applying the dynamic brake to the motor independent of the brake contactor B. This dynamic brake circuit includes only a portion of the brake resistance B'R' and will have the effect of bringing the motor to rest very quickly. The field circuit under the condition of failure of voltage is established in parallel with the brake resistance, being connected with one side of the armature at the contact 33, and with the other side of the armature at the point 38.

While I have described my invention as embodied in concrete form and as operating in a particular manner in accordance with the provisions of the patent statutes, it should be understood that I do not limit my invention thereto, since various modifications thereof will suggest themselves to those skilled in the art without departing from the spirit of my invention, the scope of which is set forth in the annexed claims.

What I claim as new and desire to secure by Letters Patent of the United States, is:—

1. The combination with an electric motor, reversing mechanism therefor, a brake resistance for dynamically braking the motor when the reversing mechanism is operated, and means for causing the initial dynamic braking resistance to be greater when the motor is reversed from one direction of rotation than when it is reversed from the other direction of rotation.

2. The combination with an electric motor, reversing mechanism therefor, a brake resistance connected for dynamically braking the motor when the reversing mechanism is operated, and an electromagnetic switch for short-circuiting a portion of said resistance, said switch having differential windings which oppose each other to prevent the operation of the switch when the motor is reversed from one direction of rotation and assist each other to close the switch when the motor is reversed from the other direction of rotation.

3. The combination with an electric motor, reversing mechanism therefor, a brake resistance connected for dynamically braking the motor when the reversing mechanism is operated, and an electromagnetic switch for shirt-circuiting a portion of said resistance, said switch mechanism having differential windings, one of which is connected across the line while the other has the direction of current therein reversed when the motor reverses by being connected across the motor armature.

4. The combination with an electric motor, reversing mechanism therefor, means for producing a dynamic braking torque on the motor when the reversing mechanism is operated, means for causing said motor to operate faster in one direction of rotation than the other, and means for causing the initial dynamic braking current upon the motor to be at least as great when the motor is reversed from low speed as when it is reversed from high speed.

5. The combination with an electric motor, reversing mechanism therefor, means for causing said motor to operate faster in one direction of rotation than the other, a brake resistance for dynamically braking the motor when the reversing mechanism is operated, an electromagnetic switch for short-circuiting a portion of said resistance, and connections whereby said switch closes when the motor is reversed from one direction of rotation, and remains open when the motor is reversed from the other direction of rotation.

6. The combination with an electric motor, reversing mechanism therefor, means for causing said motor to operate faster in one direction of rotation than the other, a brake resistance for dynamically braking the motor when the reversing mechanism is operated, and means for causing the initial dynamic braking current to be at least as great when the motor is reversed from low speed as it is when reversed from high speed.

7. The combination with an electric motor, reversing mechanism therefor, a brake resistance for dynamically braking the motor when the reversing mechanism is operated, electromagnetic switches for successively short-circuiting portions of said resistance to produce a graduated dynamic braking effect as the motor slows down, and connections whereby one of said switches remains closed when the motor is reversed from one direction of rotation so that the initial braking resistance is less than it is when the motor is reversed from the other direction of rotation.

8. The combination with an electric motor, reversing mechanism therefor, a brake resistance for dynamically braking the motor when the reversing mechanism is operated, electromagnetic switches for successively short-circuiting portions of said resistance to produce a graduated dynamic braking effect, one of the switches being connected to close upon a predetermined field strength while the other depends upon the direction of rotation of the motor.

9. The combination with an electric motor, reversing mechanism therefor, a brake resistance for dynamically braking the motor when the reversing mechanism is operated, and electromagnetic switches for short-circuiting portions of said resistance to produce a graduated dynamic braking effect, one of said switches being connected to close upon a predetermined field strength while the other closes immediately when the motor is reversed from one direction of rotation but does not close when the motor is reversed from the other direction of rotation until the speed of rotation has fallen to a low value.

10. The combination with an electric motor, reversing mechanism therefor, a brake resistance for dynamically braking the motor when the reversing mechanism is operated, and an electromagnetic switch for short-circuiting a portion of said resistance, said switch being connected to operate immediately when the motor is reversed from one direction of rotation but does not close when the motor is reversed from the other direction of rotation until the speed of the motor has fallen to a low value.

11. The combination with an electric motor, reversing mechanism therefor, a brake resistance for dynamically braking the motor when the reversing mechanism is operated, an electromagnetic switch connected to close upon a predetermined field strength and short circuit a portion of said resistance and connections whereby the reversing mechanism is prevented from operation until the said switch closes.

12. The combination with an electric motor, reversing mechanism therefor comprising an electromagnetic switch for each direction of rotation, a brake resistance for dynamically braking the motor when the reversing mechanism is operated, an electromagnetic switch connected to close upon a predetermined field strength to short-circuit a portion of said resistance, and connections whereby one of the reversing switches will not close until the electromagnetic switch which is controlled by the field strength closes but will remain closed when said switch is opened.

13. The combination with an electric motor, of electromagnetic switch mechanism for reversing the same, a pilot switch operated by the motor for controlling the reversing switches, a brake resistance for dynamically braking the motor when the reversing switches are operated, manually operated switches for controlling the reversing switches independently of the pilot switch, and means whereby the brake resistance is automatically short-circuited when the motor is dynamically braked from one direction of rotation under the control of the said manual switches.

14. The combination with an electric motor having a shunt field winding and a supply circuit therefor, of a brake resistance for dynamically braking the motor, and connections whereby the shunt field winding is connected across the motor armature terminals in parallel with the brake resistance when the supply circuit to the motor is opened.

15. The combination with an electric motor having a shunt field winding, of a brake resistance for dynamically braking the motor, an automatic circuit breaker for cutting off the current supply to said motor and connections whereby the shunt field winding is connected across the motor armature terminals in parallel with the brake resistance when the circuit breaker opens.

16. The combination with an electric motor of a controlling mechanism therefor, a brake resistance for dynamically braking the motor when the controlling mechanism is operated, an automatic circuit breaker for cutting off the current supply to said motor, and connections whereby the motor is dynamically braked through a portion of the brake resistance when the circuit breaker opens.

17. The combination with an electric motor having a shunt field winding and a supply circuit therefor, of a controlling mechanism for said motor, a brake resistance for dynamically braking the motor when the controlling mechanism is operated, and connections whereby the shunt field winding is connected across the motor armature terminals in parallel with a portion of the brake resistance when the supply circuit of the motor is opened.

18. The combination with an electric motor having a shunt field winding, of a controlling mechanism for said motor, a brake resistance for automatically braking the motor when the controlling mechanism is operated, an automatic circuit breaker for cutting off the current supply to said motor and connections whereby the shunt field winding is connected across the motor armature terminals in parallel with a portion of the brake resistance when the circuit breaker opens.

19. The combination with an electric motor having a shunt field winding and a supply circuit therefor, of a brake resistance for dynamically braking the motor, and connections whereby, upon the occurrence of abnormal circuit conditions, the motor is disconnected from the supply circuit and the shunt field is connected across the motor armature terminals in parallel with the brake resistance.

20. In a motor-control system, the combination with an electric motor, and reversing mechanism therefor, of a dynamic-braking circuit for said motor comprising a resistor, and means controlled by said reversing mechanism for varying the effective portion of said resistor in accordance with the direction of rotation of said motor.

21. In a motor-control system, the combination with an electric motor, and reversing mechanism therefor, of a dynamic-braking circuit for said motor comprising a resistor, and a switch controlled by said reversing mechanism for shunting a portion of said resistor whenever the reversing mechanism is adjusted for operation of said motor in one direction.

22. In a motor control system the combination with an electric motor, a reversing mechanism therefor, means for causing said motor to operate faster in one direction of rotation than in the other, means for closing the armature circuit on itself on each reversal to produce a dynamic braking effect, a resistance in said circuit and means for automatically varying the effective portion of said resistance in accordance with the direction of rotation of said motor.

23. In a motor control system the combination with an electric motor, a reversing mechanism therefor, means for controlling the field strength of said motor to cause the motor to operate faster in one direction of rotation than in the other, means for closing the armature circuit on itself on each reversal to produce a dynamic braking effect, a resistance in said circuit and means for automatically varying the effective portion of said resistance in accordance with the direction of rotation of said motor.

In witness whereof, I have hereunto set my hand this 6th day of February, 1914.

JOHN EATON.

Witnesses:
 MARGARET A. DELEHANTY,
 HELEN ORFORD.